(12) United States Patent
Hidaka et al.

(10) Patent No.: US 6,240,204 B1
(45) Date of Patent: *May 29, 2001

(54) IMAGE DATA CONVERSION ON THE BASIS OF OBSERVATION LIGHT OF AN OUTPUT IMAGE

(75) Inventors: Yumiko Hidaka, Inagi; Toshiyuki Mizuno, Yokohama; Yoshinobu Shiraiwa, Machida, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/712,262

(22) Filed: Sep. 11, 1996

(30) Foreign Application Priority Data

Sep. 12, 1995 (JP) .................................. 7-234224
Aug. 28, 1996 (JP) .................................. 8-226645

(51) Int. Cl.⁷ .................................. G06K 9/00
(52) U.S. Cl. .................................. 382/167; 382/311
(58) Field of Search .................. 382/162, 167, 382/274, 311, 304; 358/523, 450, 518, 436; 348/232, 234, 602, 603, 716, 717, 650, 655, 661, 223, 24, 564, 566, 588; 345/154, 327, 115; 356/425; 355/35, 83

(56) References Cited

U.S. PATENT DOCUMENTS

| | | | |
|---|---|---|---|
| 4,654,794 | * 3/1987 | O'Brien | 356/425 |
| 4,962,421 | * 10/1990 | Murai | 358/530 |
| 5,204,736 | * 4/1993 | Abe | 358/500 |
| 5,412,773 | * 5/1995 | Carlucci et al. | 345/327 |
| 5,438,428 | * 8/1995 | Itoh | 358/436 |
| 5,566,283 | * 10/1996 | Modegi et al. | 345/426 |
| 5,617,141 | * 4/1997 | Nishimura et al. | 348/234 |
| 5,691,772 | * 11/1997 | Suzuki | 348/223 |

FOREIGN PATENT DOCUMENTS

| | | | | |
|---|---|---|---|---|
| 0528358A2 | * | 2/1993 | (EP) | H04N/1/46 |
| 2207023 | * | 1/1989 | (GB) | H04N/1/40 |

OTHER PUBLICATIONS

OmniPage Professional, Image Assistant, 1993, pp.22–23.*

* cited by examiner

*Primary Examiner*—Amelia M. Au
*Assistant Examiner*—Timothy M. Johnson
(74) *Attorney, Agent, or Firm*—Fitzpatrick, Cella, Harper & Scinto

(57) ABSTRACT

An image processing apparatus performs a conversion process according to observation environment light of an output image. The apparatus includes a conversion processor for performing a conversion process on image data, on the basis of light source information corresponding to the observation environment light of the output image. The apparatus has a first mode to perform the conversion process according to a plurality of light source information, and to output in parallel simultaneously the image data converted on the basis of the plurality of light source information, and a second mode to select desired light source information from among the plurality of light source information by an instruction of a user, and to perform the conversion process according to the selected light source information.

8 Claims, 13 Drawing Sheets

IMAGE DATA CONVERSION ON THE BASIS OF OBSERVATION LIGHT OF AN OUTPUT IMAGE

BACKGROUND OF THE INVENTION

1. Field of the Invention

The present invention relates to an image processing apparatus and method for performing a color process according to an ambient light in case of observing an image.

2. Related Background Art

Color image products have recently been diffused popularly, and thus a color image can easily be managed not only in a specialized field such as, e.g., design formation using a computer graphics (CG), but also in a general office, whereby a number of input and output devices have widely been used. Therefore, a serious problem has occurred relating to a difference in color becomes due to the use of different devices, suggesting the need for a color management system for solving such a problem.

The color management system eliminates the difference in color among respective devices by using the common color space. The system is based on a concept that, if the color is positioned at the same coordinates in one color space even in the different device, such color can be viewed as the same color. On the basis of this concept, in the system, all of the colors are represented by using the single color space, which acts as a reference color space, so as to make the color at the same coordinates seem coincident. At present, it is proposed, as the color space, a method that XYZ three stimulus values (or tristimulus values) be used to correct the difference in color for each device.

However, in a case where a light-emission color (light source color) which is displayed on a monitor coincides with a color (material color) of such as a printed matter which can be seen by means of light reflection, the difference in color cannot fully be corrected only in the above manner due to a difference in color mode.

For example, in a case such as where an image read by a scanner is displayed on a monitor or the image displayed on the monitor is printed, an observation is frequently performed with a juxtaposing between the monitor and the printed matter or original. In this case, there is a problem that the color on the monitor is different from the color on the printed matter or original.

In such a case, the image on the monitor or the original is not always observed with a determined ambient light. That is, a kind or brightness of a light source is being varied. Therefore, if the color on the monitor is desired to be the same as the color on the original, it is necessary to obtain information concerning such observation environment (i.e., ambient light information). Then, in case of performing the observation in one environment, it is predicted based on the ambient light information obtained by a sensor what value (e.g., an XYZ value) the image obtains, to reproduce the obtained value as faithfully as possible by using a profile for each device, thereby making the seem coincident the color at the same coordinates coincident (color-measurement or colorimetry coincidence).

However, the environment where the actually-output image is observed is not always equal to the environment where an image output apparatus is placed. That is, in general, both the image output by a printer and the image copied by a copy machine are observed in various environments. In the above-conventional apparatus, since an ambient light sensor is built in the image output apparatus, if the image is observed in the environment where the image output apparatus is being placed, the color correction can fully be performed taking the environment into consideration. However, if the image is observed in an environment (e.g., other conference room, branch office or the like) which is different from the environment where the image output apparatus is being placed, the image which is optimized taking its observation environment into consideration cannot be output. Therefore, a phenomenon occurs that the color of the image which is actually seen by a user does not seem to coincide with the color of the image at the time when such image was formed.

Further, it is supposed that the ambient light sensor is mounted on various places, e.g., a front surface of the monitor, an upper portion of the printer, a front desk of the printer and the like. Therefore, the ambient light to be detected varies according to the place on which the ambient light sensor is mounted.

Furthermore, since the monitor is an emitter or an illuminant, if the monitored image is observed always in the same ambient light, the color does not seem to remarkably vary even in different observation states. On the other hand, if the printed image is observed, even if such the observation is always performed in the same ambient light, a light quantity which enters into observer's eyes varies in accordance with the observation states. For example, in a case where the printed image is observed under a ceiling light of an office or the like, if it is supposed that the printed image is compared with the monitored image with inclining, standing and placing on an original stand the printed image, the light quantity entering into the observer's eyes varies according to each observation state even though the same image is being observed in the same ambient light.

However, the position at which the ambient light sensor is mounted is conventionally determined in relation to hardware. Therefore, in order to calculate by using information obtained from the sensor the light quantity which is actually sensed by the observer, one observation state of the image has previously been determined, and then data obtained from the sensor is converted into the light quantity which is actually sensed by the observer by using the two determined information.

In such a conventional method, if the actually-observed state is the same as the previously-determined state, no problem will occur. However, such a same state cannot always be obtained.

For example, in a case where it has been supposed the image observation environment is that the printed image is observed with a 45° incline from a table and a data conversion method has previously been determined based on such supposition, even if the observer actually observes the printed image standing vertically, merely the information in case of inclining the printed image by 45° can be obtained as ambient light data in the conventional method. Therefore, since the actual observation environment is different from the observation environment at the time of determining the conversion method, the colors obtained in these two environments cannot be seen as the same color.

Similarly, in a case where mounting position and direction of the ambient light sensor can be changed, actually-measured ambient data differs in accordance with the position and direction of the ambient light sensor. For example, in the case where the printed image is observed under the ceiling light, measured data varies depending upon whether the sensor is positioned on the ceiling light vertically or positioned horizontally. Therefore, if an ambient light calculation method is not determined based on both the position and direction of the sensor with respect to the light source and the image observation environment, the ambient light suitable for actual observation state cannot be obtained. As a result, the image on the monitor and the printed image cannot be seen as a same-color image.

The above problem occurs also in a case of outputting the image by a printer, irrespective of the difference between the light source color and the material color. That is, in a case where a color process is performed in the printer by using information from the ambient light sensor, one of the observation states of the output image is determined as a standard observation condition, and then the information from the sensor is converted such that the ambient light sensed by the sensor becomes an ambient light which should be sensed by a human when he observes it in the standard observation condition. However, when the observation state is actually different from the previously-determined condition, as in the above cases, the ambient light information which is actually sensed by the observer becomes different from the ambient light information which has been converted based on the standard observation condition.

SUMMARY OF THE INVENTION

The present invention is made in consideration of the above-mentioned problems. That is, an object of the present invention is to be able to output an image which was optimized with taking observation environment of the output image into consideration.

In order to achieve the above object, the present invention provides an image processing apparatus comprising:

input means for inputting an image signal representing a color image;

a measurement unit which is detachably mounted on the apparatus, and is capable of measuring by being released from a main body of the image processing apparatus a light source in arbitrary environment different from ambient environment of the image processing apparatus; and light source conversion process means for performing a light source conversion process on the image signal input from the input means, on the basis of light source information concerning the light source in arbitrary environment obtained by the measurement unit.

Particularly, the object of the present invention is to be able to perform a conversion process with taking influence of an observation light according to an observation state into consideration.

In order to achieve the above object, the present invention provides an image processing apparatus comprising:

input means for inputting observation light information and observation state information concerning the observation state of an output image;

conversion means for converting the observation light information into observation light information according to the observation state, on the basis of the observation state information; and correction means for correcting input image data on the basis of the observation light information.

An another object of the present invention is to easily obtain an image which has been conversion-processed based on an observation light according to use of a user.

In order to achieve the above object, the present invention provides an image processing apparatus comprising:

storage means for storing a plurality of light source information; and conversion process means for performing a conversion process on image data, on the basis of-the light source information stored in the storage means, wherein the apparatus has, a first mode to perform the conversion process according to each of the plurality of light source information, and a second mode to select the desired light source information from among the plurality of light source information, and to perform the conversion process according to the selected light source information.

Further, in order to achieve the above object, the present invention provides an image processing apparatus comprising:

detection means for detecting an observation light to generate light source information;

storage means for storing the light source information;

setting means for setting whether or not the light source information is to be generated by the detection means;

conversion means for converting image data by using the light source information stored in the storage means or the light source information generated by the detection means; and control means for controlling which of the light source information stored in the storage means and the light source information generated by the detection means is to be used in the conversion means, in accordance with the setting by the setting means.

Other objects and forms of the present invention will be apparent from the following description in conjunction with the drawings and the attached claims.

DETAILED DESCRIPTION OF THE PREFERRED EMBODIMENTS

It will be explained hereinafter the embodiments of the present invention with reference to the attached drawings.

That is, it will be explained hereinafter the embodiment in which the present invention is applied to a copy machine. Similarly, it should be noted that the present invention can also be applied to an another image output apparatus such as a printer or another image processing apparatus such as a monitor.

(First Embodiment)

Figure 1:
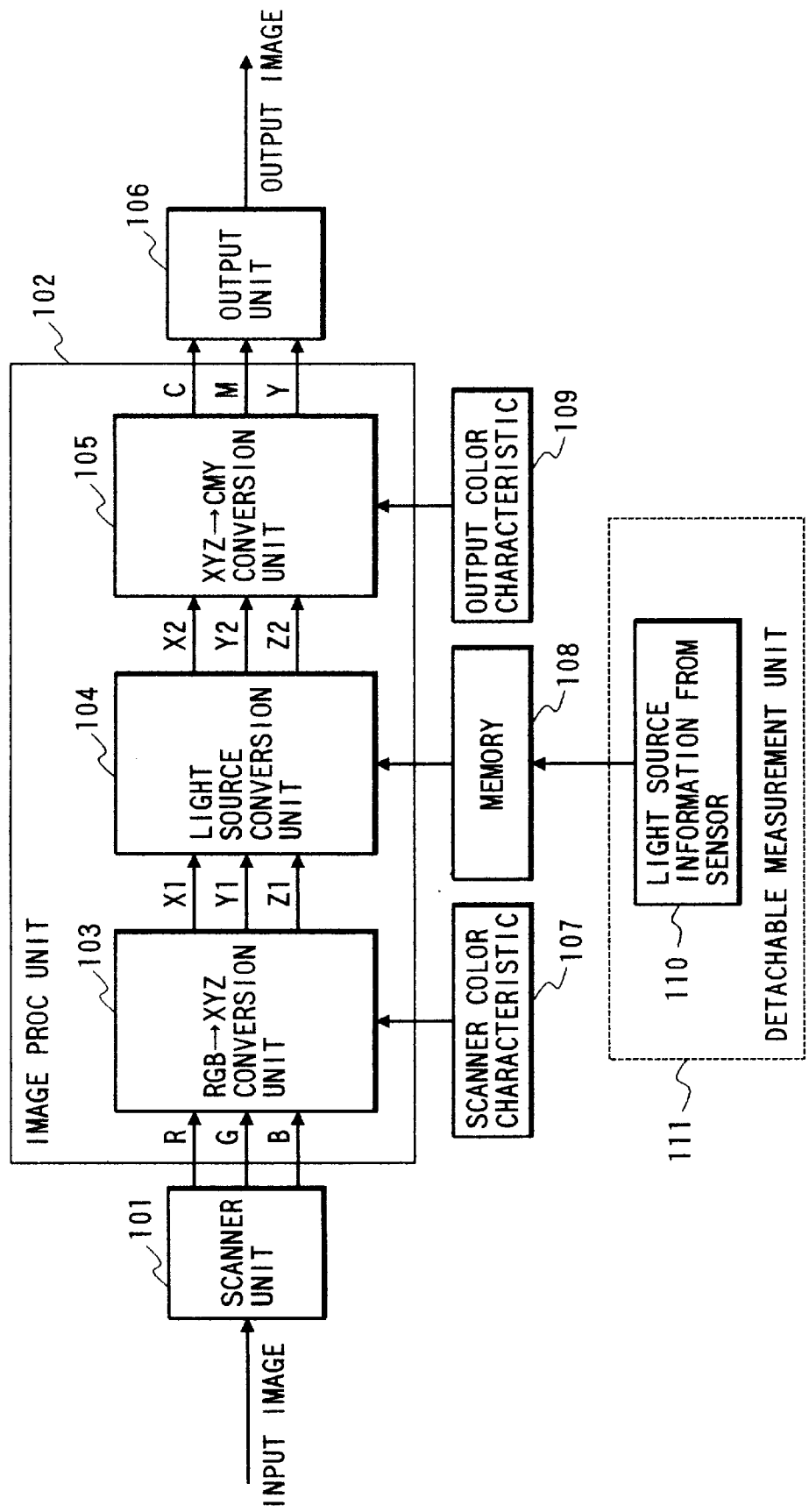
FIG. 1 is a block diagram showing a circuit configuration and a data flow in a case where the present invention is applied to a copy machine.
Figure 2:
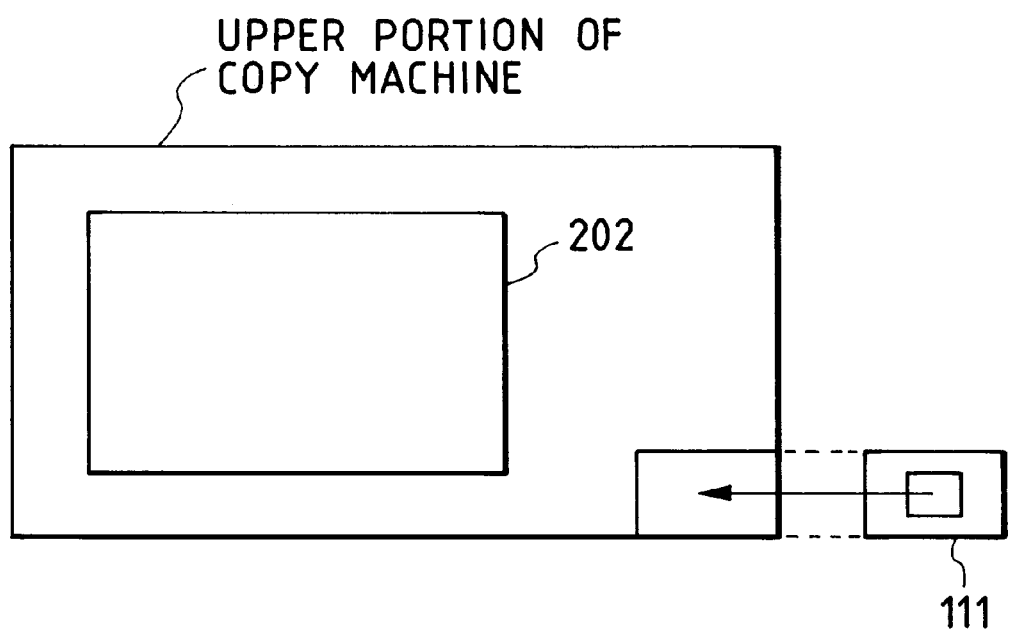
FIG. 2 is a plan view showing a detachable measurement unit which is detachably mounted on an upper portion of the copy machine of FIG. 1.

FIG. 1 is a view showing a data flow within a copy machine, and FIG. 2 is a view showing a detachable measurement unit 111 which is mounted on the copy machine. Hereinafter, explanation will be given with reference to copy machine on which the detachable measurement unit consisting of the feature of the present invention is mounted.

The detachable measurement unit 111 is made by integrating a recording medium (e.g., a PCM CIA card) and a color measurement unit (or a colorimeter).

In FIG. 1, a scanner unit 101 is a full-color scanner which has a color image sensor such as a CCD or the like generally used in a color copy machine. If an original image is placed on an original support plate 202 of FIG. 2, e.g., RGB (red, green and blue) data can be obtained from the scanner unit 101.

The RGB data obtained by the scanner unit 101 is converted into $X_1Y_1Z_1$ data of an XYZ color system by an RGB-XYZ conversion unit 103 of an image process unit 102, on the basis of scanner color characteristic data 107. Then, the $X_1Y_1Z_1$ data are subjected to a light source conversion (to be explained later) by a light source conversion unit 104 on the basis of light source information of observation environment, so as to form an image suitable for the observation environment.

Figure 3:
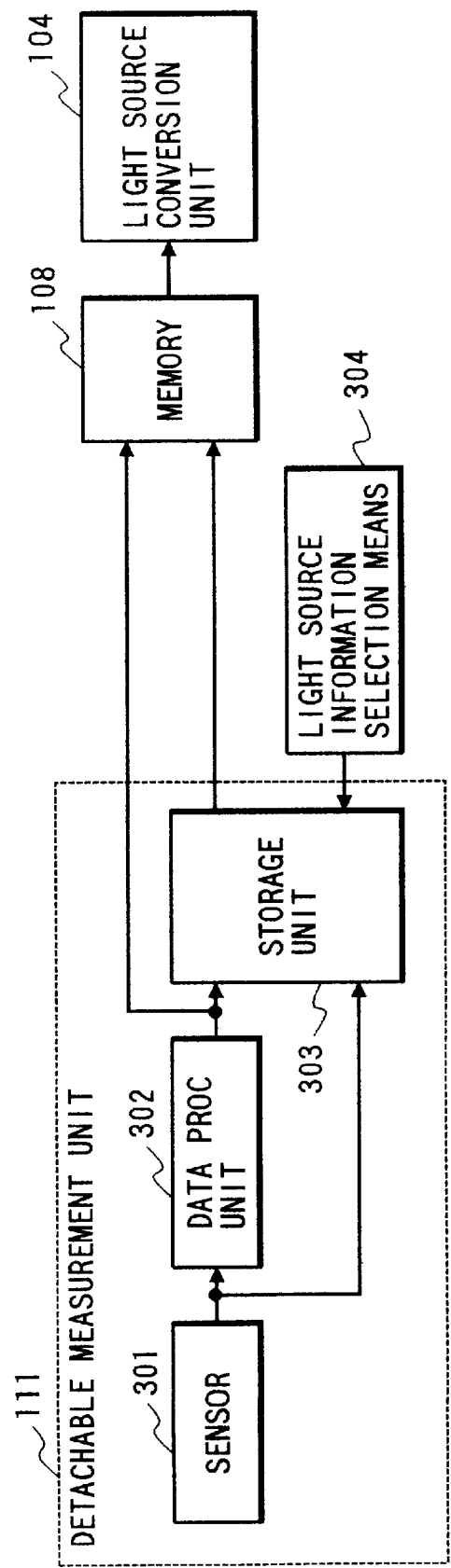
FIG. 3 is a block diagram showing an example of a configuration of the detachable measurement unit of FIG. 2.

In this case, light source information 110 is obtained from the detachable measurement unit 111 mounted on the upper portion of the copy machine (to be referred as an output device hereinafter), as shown in FIG. 2. For example, as shown in FIG. 3, the detachable measurement unit 111 is composed of a sensor 301 which senses or measures a light, a data process unit 302 which converts data obtained from the sensor 301 into necessary various values, and a storage unit 303 which records or stores the value measured by the sensor 301 and the value data-processed by the data process unit 302.

Prior to an ordinary copy operation, a user initially releases the detachable measurement unit 111 from the output device and then places the unit 111 under environment in which he wishes to observe an output image. The unit 111 has the sensor 301 for sensing a light source (e.g., a room light) of such the environment, so that spectral data of the light source under one environment can be obtained from the sensor 301. Then, XYZ values of CIE (spectral tristimulus values) are obtained from the spectral data by the data process unit 302. The storage unit 303 records or stores the spectral data obtained by the sensor 301 and the XYZ values obtained by the data process unit 302. By sequentially placing the measurement unit 111 under a plurality of environments, a plurality of light source information can be stored in the storage unit 303. That is, the storage unit 303 stores one or more light source information. Further, a light source information selection means 304 is provided, so that the user can cause the selection means 304 to selectively output the light source information if necessary. Of course, the user can obtain and output the current light source information by using the sensor 301. The user can manually set whether the light source information stored in the storage unit 303 is to be output or the current light source information obtained by using the sensor 301 is to be output, by means of a manual operation unit (not shown).

In case of outputting the image, the user mounts the detachable measurement unit 111 on the output device. Then, the light source information output from the measurement unit 111 is stored into a memory 108 within the output device, and the light source information is then subjected to a data conversion by the light source conversion unit 104.

Figure 4:
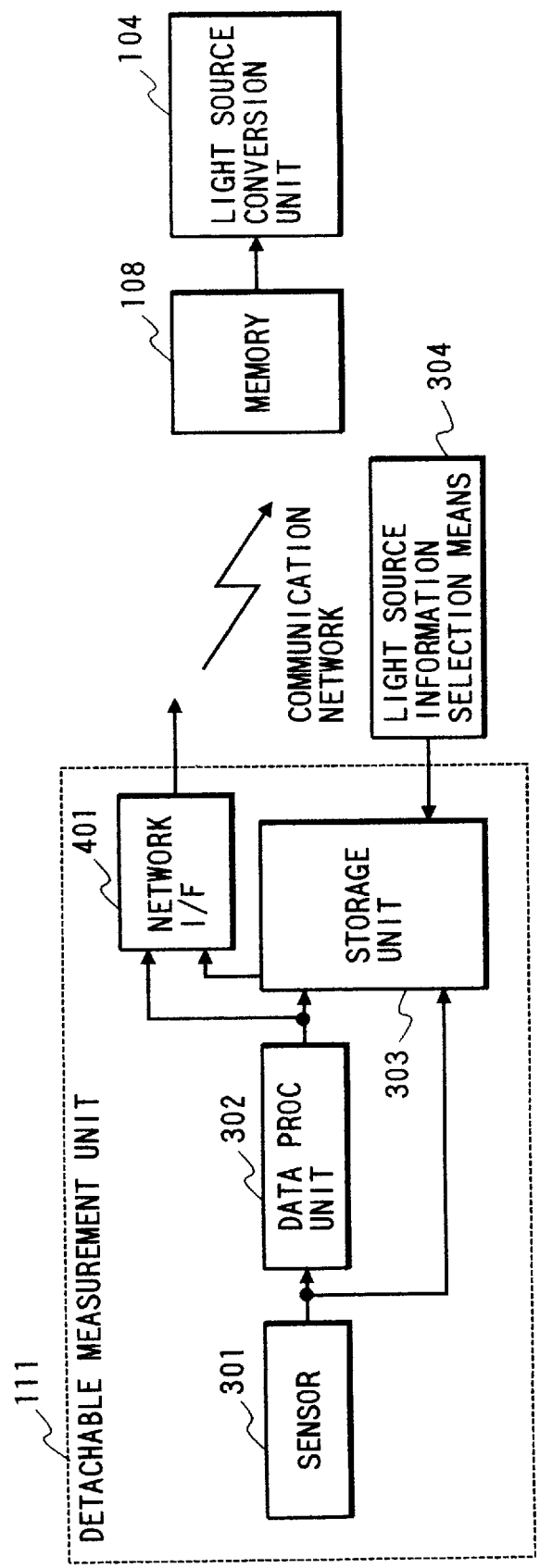
FIG. 4 is a block diagram showing another example of a configuration of the detachable measurement unit of FIG. 2.

Further, in case of outputting the image, as shown in FIG. 4, the detachable measurement unit 111 may not be mounted on the output device such that data concerning the read light source information is recorded in the storage unit 303 at the place where the light source information was read and simultaneously transferred to the memory 108 in the output device by a wire or wireless communication via a network interface 401.

Then, in the light-source-conversion unit 104, the light source conversion is performed for the input data $X_1Y_1Z_1$ on the basis of the light source information 110 obtained from the sensor 301. The light source conversion is performed by using following adaption (or accommodation) equations (1) and (2) of Von Kries, to obtain data $X_2Y_2Z_2$.

Equation (1): matrix of the adaptation equation of Von Kries $$\begin{pmatrix} mg & 2.953(mr-mg) & 0.220(mb-mg) \\ 0 & mr & 0 \\ 0 & — & mb \end{pmatrix}$$

where $$\begin{cases} mr :: 1 \\ mg :: (1.220x_2 - 2.733y_2 2.220)y_1/(1.220x_1 - 2.733y_1 - 2.220)/y_2 \\ mb :: (1-x_2-y_{2y_1})/(1-x_1-y_2)/y_2 \end{cases}$$

$$\begin{cases} x_1, y_1 :: \text{chromaticity value of a light source 1} \\ x_2, y_2 :: \text{chromaticity value of a light source 2} \end{cases}$$

$$\begin{pmatrix} X_2 \\ Y_2 \\ Z_2 \end{pmatrix} = (M2)(M1)\begin{pmatrix} X_1 \\ Y_1 \\ Z_1 \end{pmatrix} \quad \text{Equation (2)}$$

The matrix M1 in the equation (2) is obtained by substituting each chromaticity value of the light sources 1 and 2 for the equation (1) with considering the light source 1 as a light source for illuminating an original in the copy machine when reading the input image and considering the light source 2 as a-light source for illuminating the output image when observing the output image obtained from the detachable measurement unit 111. Further, the matrix M2 is obtained by substituting each chromaticity value of the light sources 1 and 2 for the equation (1) with considering the light source 1 as a observation light source of the output image and considering the light source 2 as a light source (e.g., C light source) which was used to measure a color label when calculating an output color characteristic. By performing the above correction as to the light sources, an appropriate color correction suitable for the observation light source can be performed.

Output color characteristic data 109 supplied to an XYZ-CMY conversion unit 105 represents a relationship between CMY (cyan, magenta and yellow) data which are input to an output unit 106 and the XYZ data obtained when measuring the color label printed based on the CMY data. Also, the relationship between the CMY data and the XYZ data corresponds to a relationship between input and output of a look-up table (LUT).

In the XYZ-CMY conversion unit 105, the color signals $X_2Y_2Z_2$ which were subjected to the light source conversion by the light source conversion unit 104 as above as further converted into the output color signals CMY by using the LUT data 109 stored in an output color characteristic unit. Although the output color characteristic data 109 is used in the form of LUT, it should be noted that the data 109 may be output in a form of matrix.

An output image which is printed out from the output unit 106 by using the above-obtained color signals CMY. As the output unit 106, various known color printers such as a laser beam printer (LBP), an inkjet printer and the like are applicable.

The measurement unit 111 may measure and store not only the spectral data but also the tristimulus values or the like. Further, the data process unit 302 may not be provided, and thus the values measured by the sensor 301 may directly be recorded in the storage unit 303. Furthermore, the storage unit 303 may not be provided, and thus the light source information may directly be transferred to the memory 108. In a case where the measurement unit 111 is mounted on the copy machine, the unit 111 senses the light of the ambient environment in which the copy machine is placed. On the other hand, in a case where the unit 111 is released from the copy machine to be used, the unit 111 can record the light source information under the various environments other than the environment in which the copy machine is placed. The selection means 304 is used to select the necessary light source information from among the light source information of the recorded various environments. The selection means 304 may be mounted not only on the detachable measurement unit 111 but also on the copy machine main body. In the present embodiment, the adaptation equation of Von Kries is used for the light source conversion, but other equation for the light source conversion may also be used.

According to the above-mentioned processes, the various light source information can easily be obtained by using the detachable measurement unit 111. Further, the light source information can easily be updated to most-recent information by measuring the light source by the sensor 301.

It will be explained hereinafter an example of an process to which the first embodiment of the present invention is applied, with reference to FIGS. 6, 7 and 8.

Figure 6:
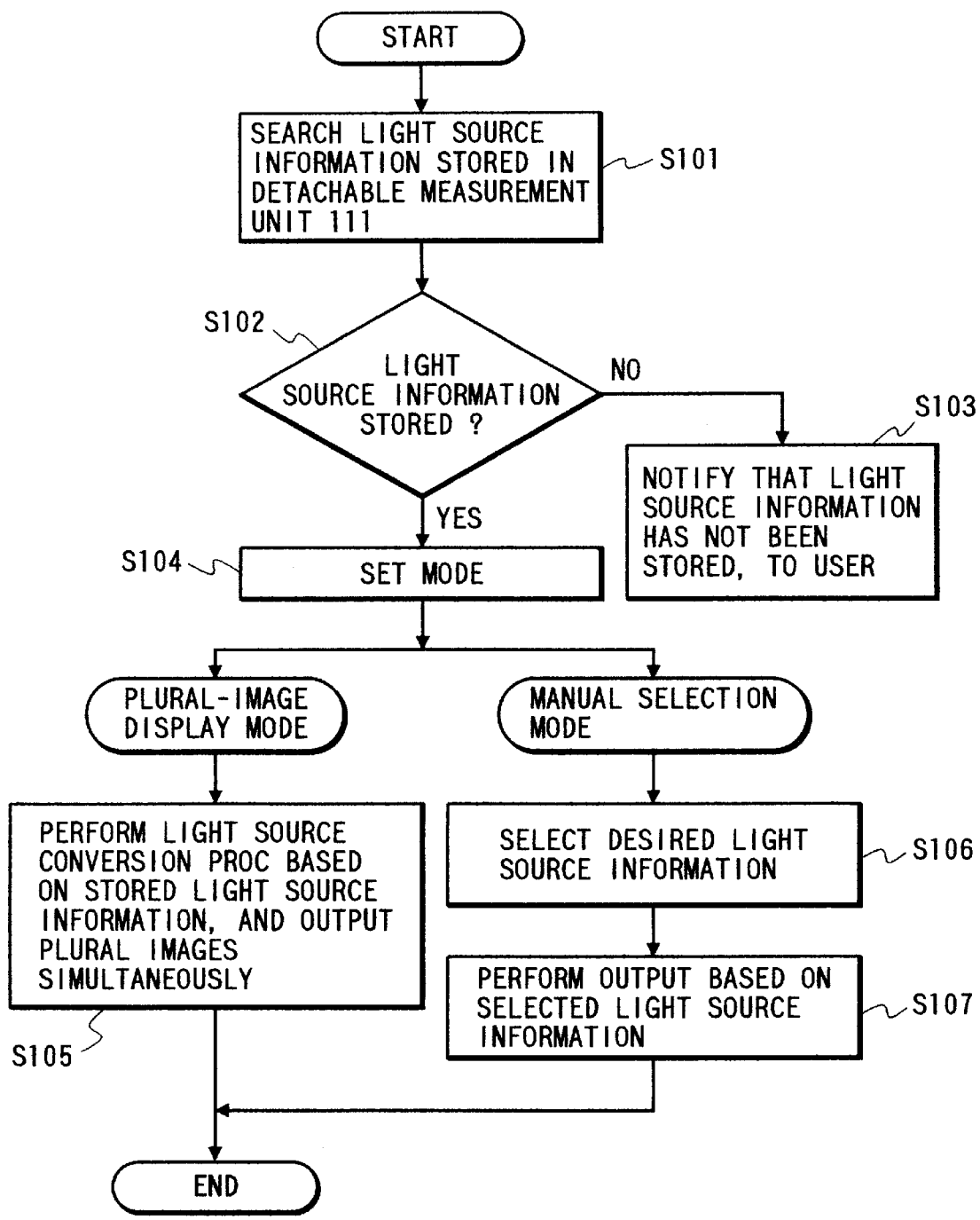
FIG. 6 is a flow chart explaining an example of a process to which the first embodiment of the present invention is applied.

FIG. 6 is a flow chart showing a flow of the process.

In the drawing, the light source information stored in the storage unit 303 in the detachable measurement unit 111 is searched (step S101). As a result of the search, it is judged whether or not the light source information is stored (step S102). If it is judged that the light source information is not stored, it is notified to the user that the light source information is not-stored (step S103). On the other hand, if it is judged that the light source information is stored, a mode setting is performed (step S104).

In the present embodiment, there are provided two kinds of modes, i.e., a plural image display mode and a manual selection mode.

Figure 8:
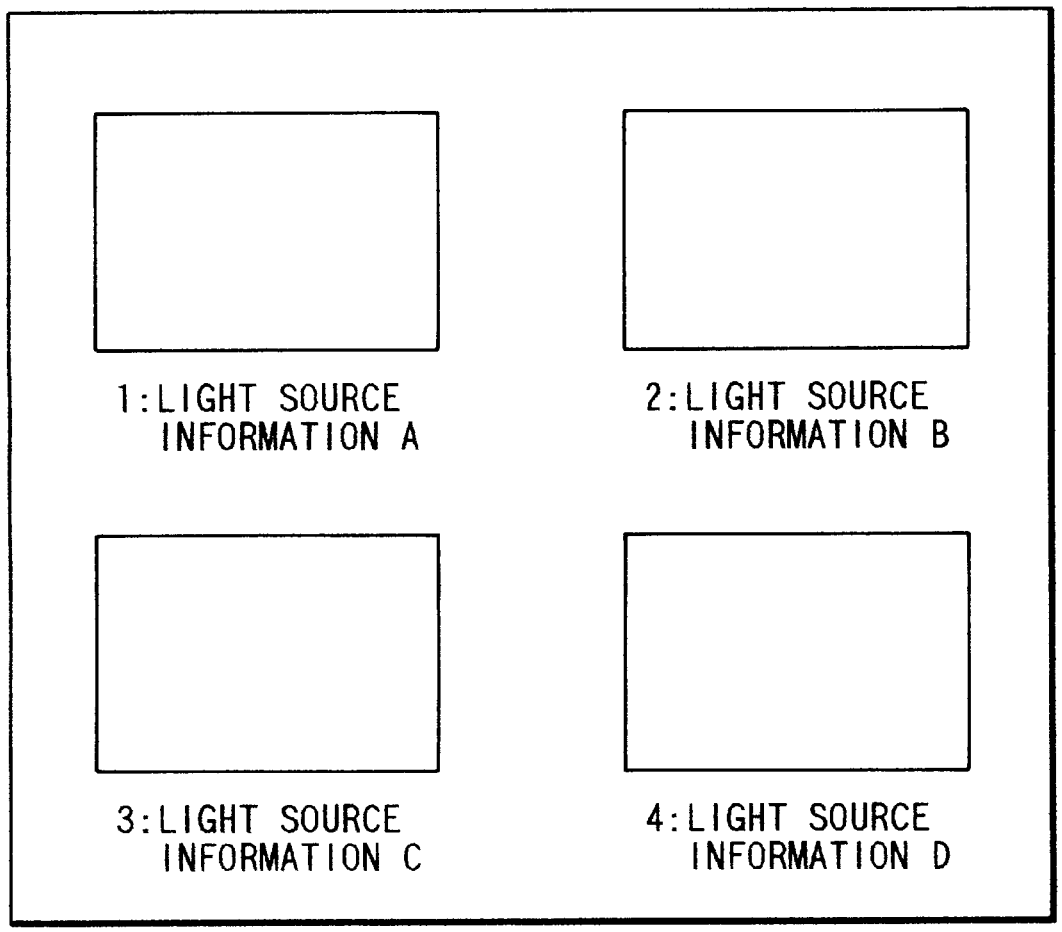
FIG. 8 is a view showing an example of an image which is output when a plural image display mode is selected in the process of FIG. 6.

In the plural image display mode, as shown in FIG. 8, the light source conversion process according to each of the plurality of light source information stored in the storage unit 303 is performed for the same input image. Then, the obtained data is subjected to a reduction layout process and simultaneously output. In the plural image display mode, a difference in the output image colors according to the plurality of light sources can easily be recognized.

In the manual selection mode, one of the plurality of light source information stored in the storage unit 303 is subjected to the light source process in accordance with desired environment.

Figure 7:
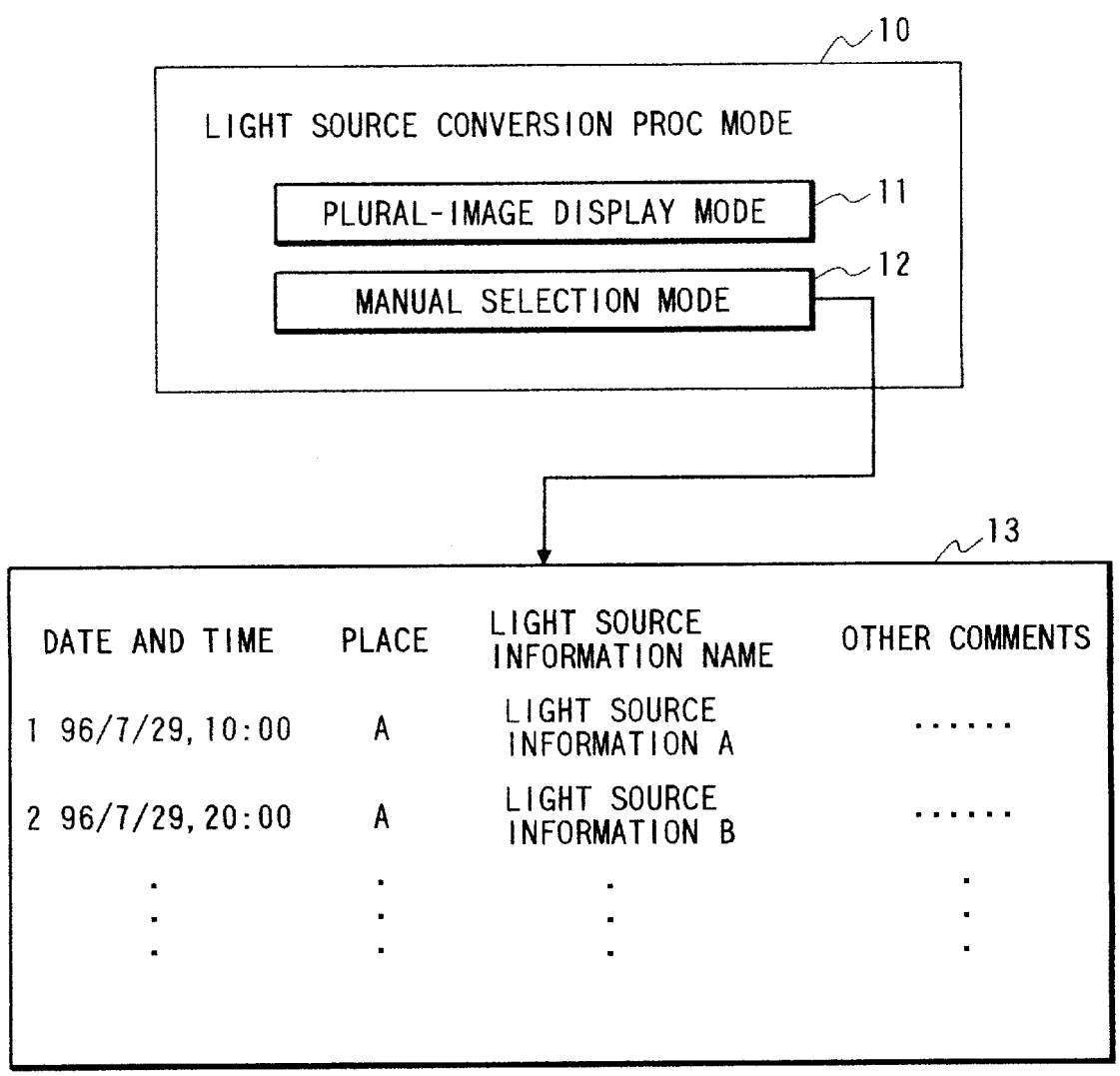
FIG. 7 is a view showing an example of a user interface to be used in the process of FIG. 6.

In the mode setting step S104, a light source conversion process mode setting image plane 10 shown in FIG. 7 is displayed on the console unit, to urge the user to select a plural image display mode setting unit 11 or a manual selection mode setting unit 12.

If the plural image display mode is set, the light source conversion process is performed on the basis of the stored light source information. Then, as shown in FIG. 8, a plurality of reduction images according to the light source information are simultaneously output together with light source information names (step S105).

On the other hand, if the manual selection mode is set, a light source selection image plane 13 shown in FIG. 7 is displayed on the console unit. On the light source information selection image plane 13, a list of the plurality of light source information (date and time when the light source information was measured, a place where the light source information was measured, the light source information name and other comments) stored in the storage unit 303 is displayed. The user selects the desired light source information from among these displayed information (step S106), and performs the light source conversion process on the basis of the selected light source information to output the converted data (step S107).

In the process shown in FIG. 6, the output image according to use of the user can easily be obtained.

It should be noted that the tristimulus values of the light source, a color temperature and the like may be added to the light source information to be displayed.

Further, other comments in the light source information are later input by the user manually.

(Second Embodiment)

It will be explained hereinafter the embodiment that, in case of using the detachable measurement unit 111 which is used in the first embodiment, light source information in one environment has previously been obtained as color data such as spectral data or the like whereby it is no need for a user to actually measure or sense a light source.

Figure 5:
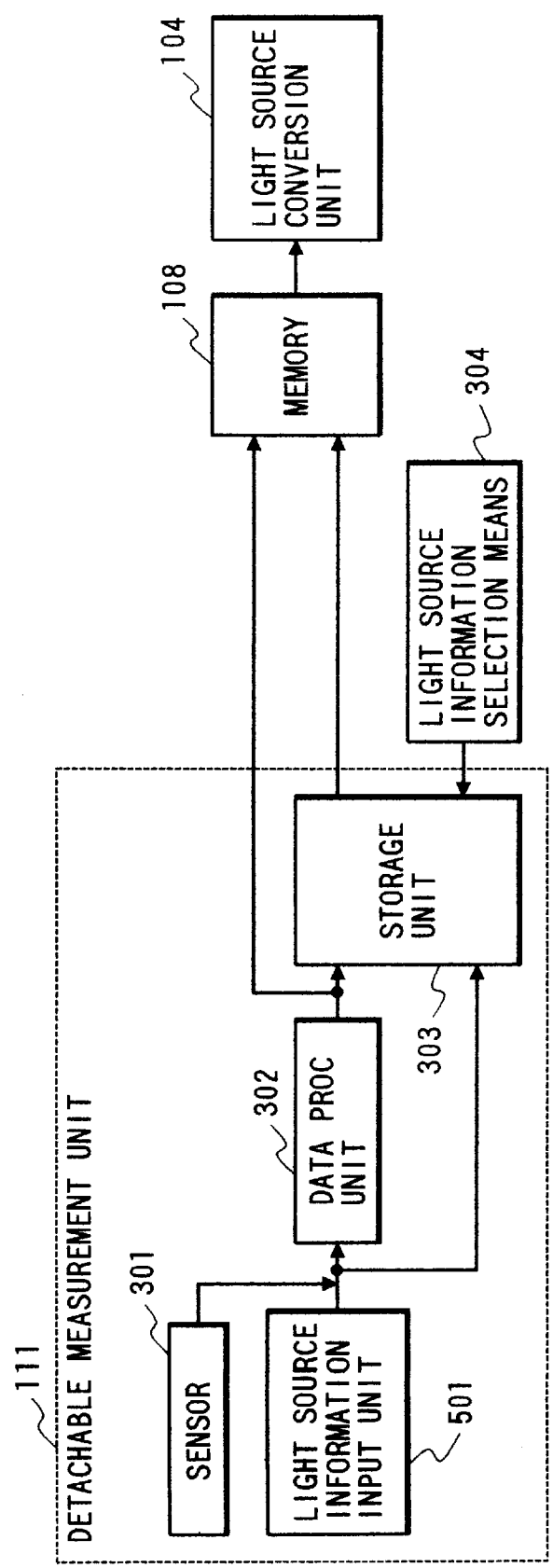
FIG. 5 is a block diagram showing further another example of a configuration of the detachable measurement unit of FIG. 2.

With respect to the light source information which has already been known, instead of sensing the light source by using a sensor 301, the measurement 111 having a light source information input unit 501 is used as shown in FIG. 5. The spectral data which is the light source information is input by the light source information input unit 501, the input light source information is subjected to necessary processes by a data process unit 302 to be recorded in a storage unit 303. Thereafter, from among the recorded light source information, the user selects the light source information under the environment in which he intends to see an image when it is output, by using a light source information selection means 304. The selected light source information is then read into the memory 108 in the output device to be subjected to a light source conversion same as in the first embodiment.

The light source information input unit 501 may be mounted on either the detachable measurement unit 111 or an output device main body, and the light source information which can be input may be other light source information, e.g., tristimulus values other than the spectrum data. Further, the data process unit 302 may be provided in the detachable measurement unit 111. On the other hand, the unit 302 may not be provided in the measurement unit 111 but may be provided in the output device such that the output device can convert an output of the sensor 301 or the light source information input unit 501 into necessary data when the output device outputs the image.

Other portions such as a configuration of the image process unit and the light are the same as those in the first embodiment.

Further, as shown in FIG. 5, in a case where both the sensor 301 and the light source information input unit 501 are provided, the light source information can be measured or sensed by the sensor 301. In a case where the light source information has already been known, even if the measurement unit 111 is not brought to a place where the output image is observed, the image suitable for output image observation environment can be formed and output by inputting the light source information from the light source information input unit 501.

(Third Embodiment)

Figure 9:
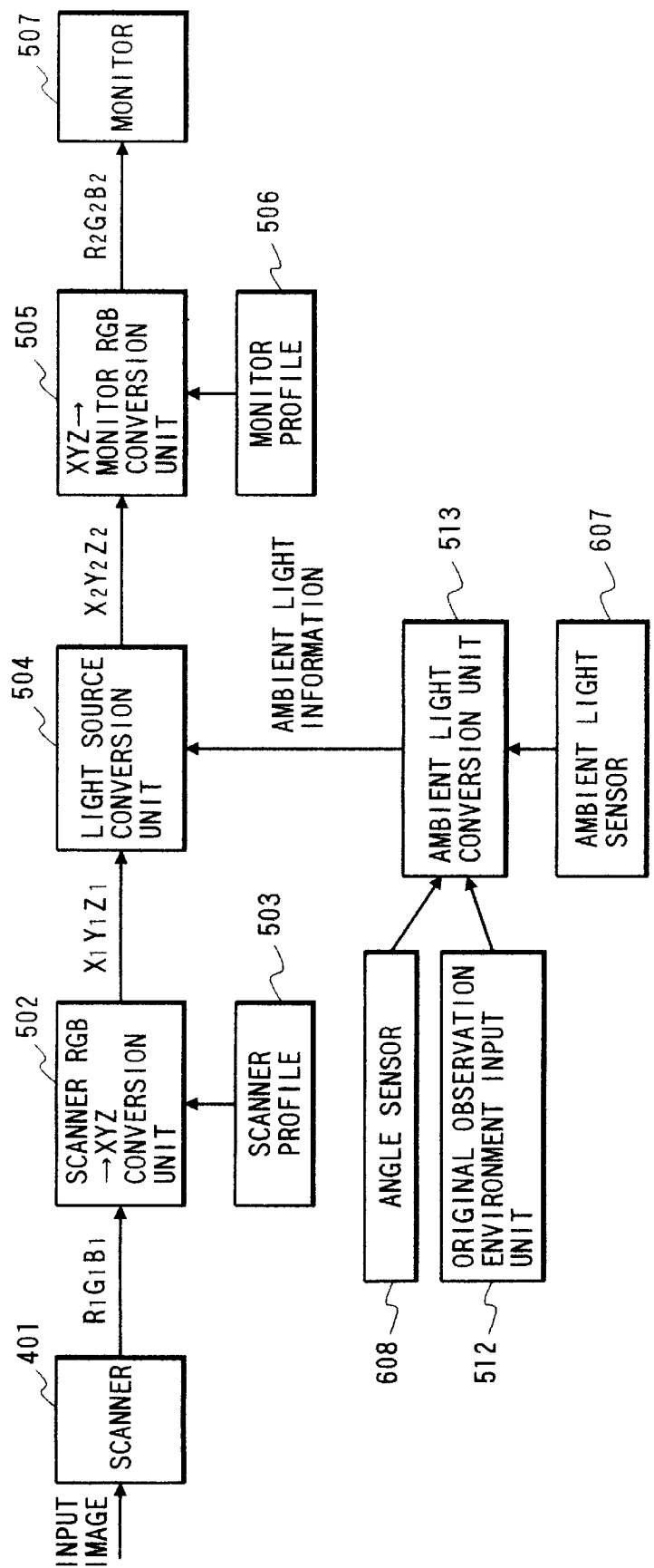
FIG. 9 is a view showing a data flow in the third embodiment of the present invention.

FIG. 9 shows a data flow in a case where an original read by a scanner is displayed on a monitor.

Initially, an input image (i.e., the original) is read by a scanner 401 to generate an image signal. $R_1G_1B_1$ obtained by the scanner 401 are converted into $X_1Y_1Z_1$ which do not depend on any device, by a scanner RGB-XYZ conversion unit 502 on the basis of information of a scanner profile 503 in which a scanner characteristic has been stored. The above conversion may use not only an XYZ color space but also any other color space, if such the color space is capable of absorbing a difference in device.

The scanner profile 503 stores data concerning a color characteristic of the scanner, e.g., a color conversion matrix (RGB→XYZ), a look-up table (LUT) or the like.

Then, in a light source conversion unit 504, the obtained $X_1Y_1Z_1$ are subjected to a light source conversion process according to an ambient light, a light source color, a mode correction of a material color and observation environment, on the basis of ambient light information, so as to generate $X_2Y_2Z_2$.

The $X_2Y_2Z_2$ are converted into $R_2G_2B_2$ which depend on the monitor, by an XYZ—monitor RGB conversion unit 505 on the basis of information of a monitor profile 506. The obtained $R_2G_2B_2$ are then output to a monitor 507.

The monitor profile 506 stores data concerning a color characteristic of the monitor, such as a monitor color temperature, a generated-light brightness, a fluorescent chromaticity, color conversion information from a standard color space to a device-dependent color signal and the like.

Hereinafter, a detection of ambient light information which is the feature of the present embodiment will be explained with reference to FIGS. 10 and 11.

Figure 10:
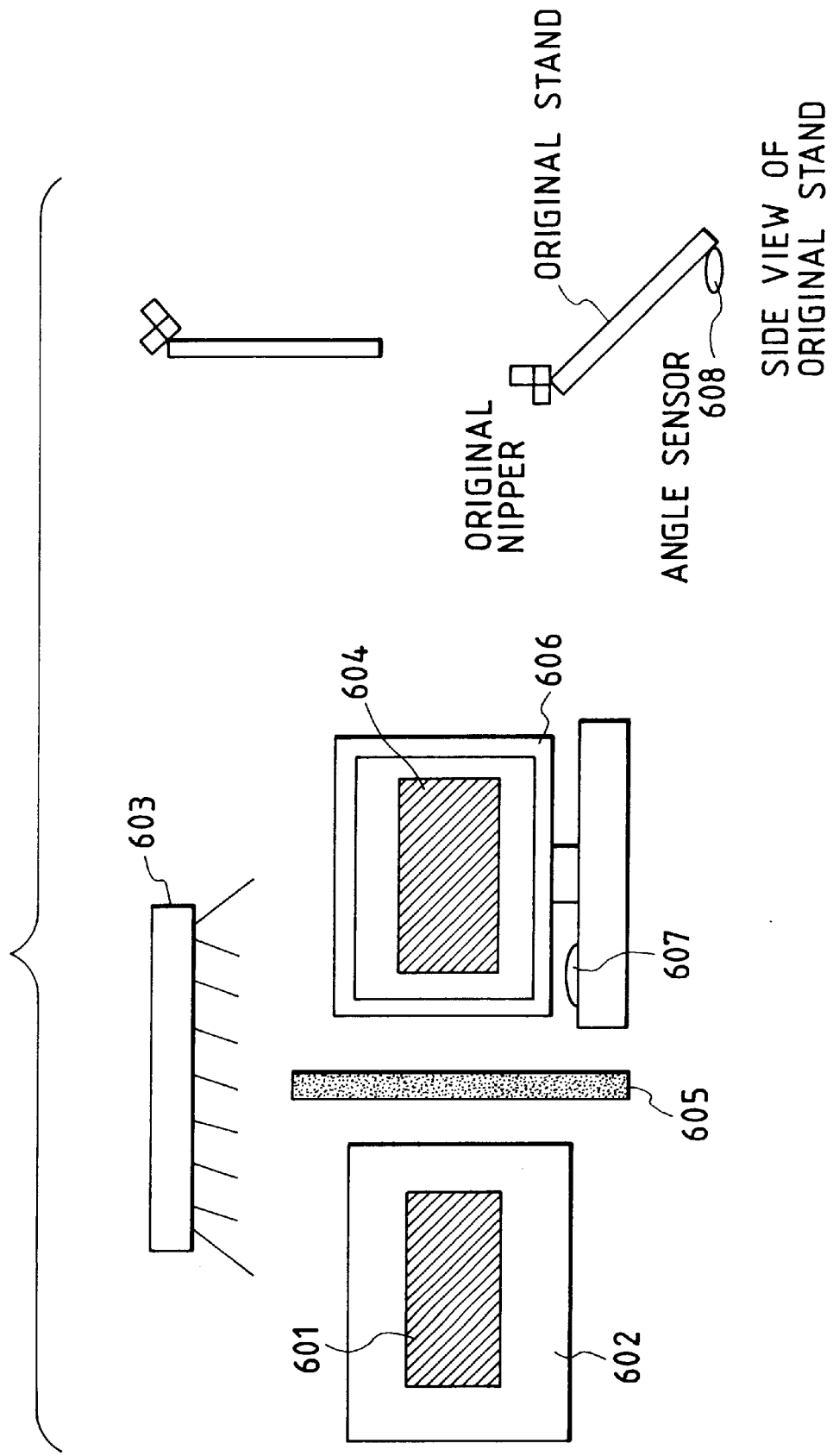
FIG. 10 is a view showing a sensor which is used to calculate image observation environment and ambient light information in the third embodiment.

FIG. 10 shows image observation environment that, in a case where the original is read by the scanner and then displayed on the monitor, the original read by the scanner is compared with the original displayed on the monitor under a light source 603.

It is shown in FIG. 10 a case where an original 601 is observed under uniform or even light sources such as in a general office space. In this case, an ambient light sensor 607 is mounted upwardly on a desk. When the original 601 is placed on an original stand 602 and then it is compared with the original displayed on the monitor, angle information and ambient light information are first obtained. That is, the angle information is obtained by measuring an inclination of the original stand from the desk, i.e., from a position at which the ambient light sensor is mounted, by using an angle sensor 608, and the ambient light information is obtained by using the ambient light sensor 607 on the desk. Then, a quantity of a light actually entered into human's or observer's eyes is calculated based on the angle information and the ambient light information, and the calculated quantity is used for the light source conversion process.

The angle information of the original stand may be input manually from an original observation environment input unit 512, instead of the angle sensor 608.

If the ambient light sensor 607 is mounted on the desk as shown in FIG. 10, since a position where the observer actually observes the image or the original is different from a sensor position, it is needed to obtain a correlation between the ambient light information obtained by the ambient light sensor and the quantity of the ambient light actually entered into the observer's eyes. If a data conversion method is determined on the premise that the original is observed at an angle 450, when the original is actually observed with vertically standing it, the data conversion which uses the light quantity different from that actually sensed by the observer is performed. Therefore, in order to obtain the data coincident with the light quantity actually sensed by the observer, it is needed by using the angle sensor for measuring the angle of the original stand to measure the angle of the original stand when the actual observation is performed.

The angle sensor reads the angle of the original stand by using a line sensor. Further, if the angle sensor is positioned at predetermined angles, the sensor reads a current angle for each position. Furthermore, the sensor reads the angle in a triangulation method using a light-emission diode.

It is assumed that the angle sensor placed on the desk is a color sensor using, e.g., RGB filters, so that chromaticity and brightness of an external light, a color temperature and the like can be obtained. In this case, the present embodiment will be explained based on an assumption that the XYZ of the ambient light can be obtained.

A color of the ambient light does not depend on the observation angle if kinds of illumination lights are all the same, but a brightness thereof varies. Therefore, the present embodiment will be explained based on an assumption that a luminance of the ambient light detected on the desk is represented as Y and the angle of the original stand obtained by the angle sensor is represented as θ radian. In this case, it is supposed that the luminance measured in angles 0 to 45° on the desk is used as the luminance of the ambient light detected on the desk. When the original or the image is actually inclined at θ radian and is observed from its substantially perpendicular direction, a luminance Y' of the light entered into the observer's eyes is obtained from an equation (3).

$$Y' = Y \cos \theta \qquad \text{Equation (3)}$$

In this case, a chromaticity of the ambient light is obtained from a general equation (4).

$$x = X/(X+Y+Z)$$
$$y = Y/(X+Y+Z) \qquad \text{Equation (4)}$$

The signal conversion according to the light source is performed by the light source conversion unit 504 on the basis of the ambient light information calculated from the equations (3) and (4).

Of course, without using these equations (3) and (4), the relationship between these two images may be obtained by using a table conversion or a conversion using other equation.

Further, if it is intended to high-accurately use the luminance which has been sensed by the observer, the angle at which the observer observes the image and the like are fixed in addition to the angle of the image on the desk, and then the ambient light is calculated by using these angles, so that the calculated luminance can be made more closer to that actually sensed by the observer.

Figure 11:
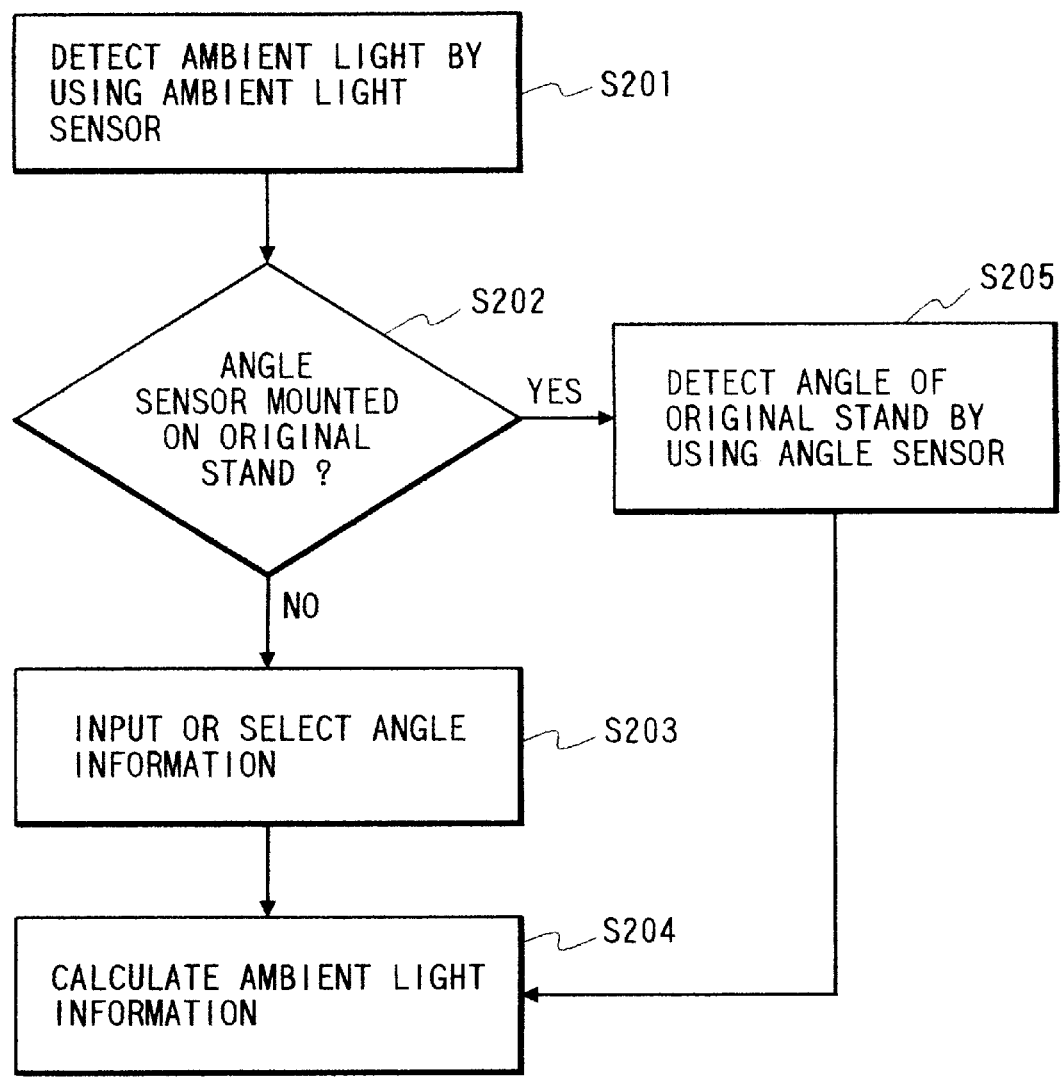
FIG. 11 is a flow chart in the calculation of the ambient light information.

FIG. 11 is a flow chart of an operation for calculating the ambient light information. In the operation, a positional relationship between the ambient light sensor and the light source is initially grasped, and the current ambient light information is detected by the ambient light sensor (step S201). Then, if the angle sensor is mounted on the original stand (step S202), the angle of the original stand when performing the observation is detected (step S205), and the correction is performed responsive to the information concerning the detected angle. On the other hand, if the angle sensor is not mounted (step S202), it is input by the original observation environment input unit 512 how the original is to be actually observed (step S203), and then the data obtained by the ambient light sensor is corrected responsive to such information, thereby obtaining the ambient light information (step S204).

It is mentioned in the present embodiment the case where the original is observed under the even light sources such as in the general office space, the ambient light sensor is mounted upwardly on the desk, and the angle sensor detects the inclination of the original stand on the desk. However, the position of the ambient light sensor varies according to the various devices. Therefore, in order to calculate the luminance which is actually sensed by the observer, the angle between the position of the ambient light sensor and the illumination light, and the actual observation state are important. Thus, correction may be performed using the correlation of the ambient light sensor, the illumination light source and the actual observation state, without using the equations (3) and (4).

According to the present embodiment, since the observation state can fully be considered, the more excellent light source conversion process can be performed, so that the appearance of color of the original can more excellently be coincided with that of the output image (displayed image).

(Fourth Embodiment)

It will next be explained a case where the ambient light sensor of the third embodiment is mounted on, instead of the desk, an original stand on which an image to be actually observed is placed, with reference to FIG. 12.

Figure 12:
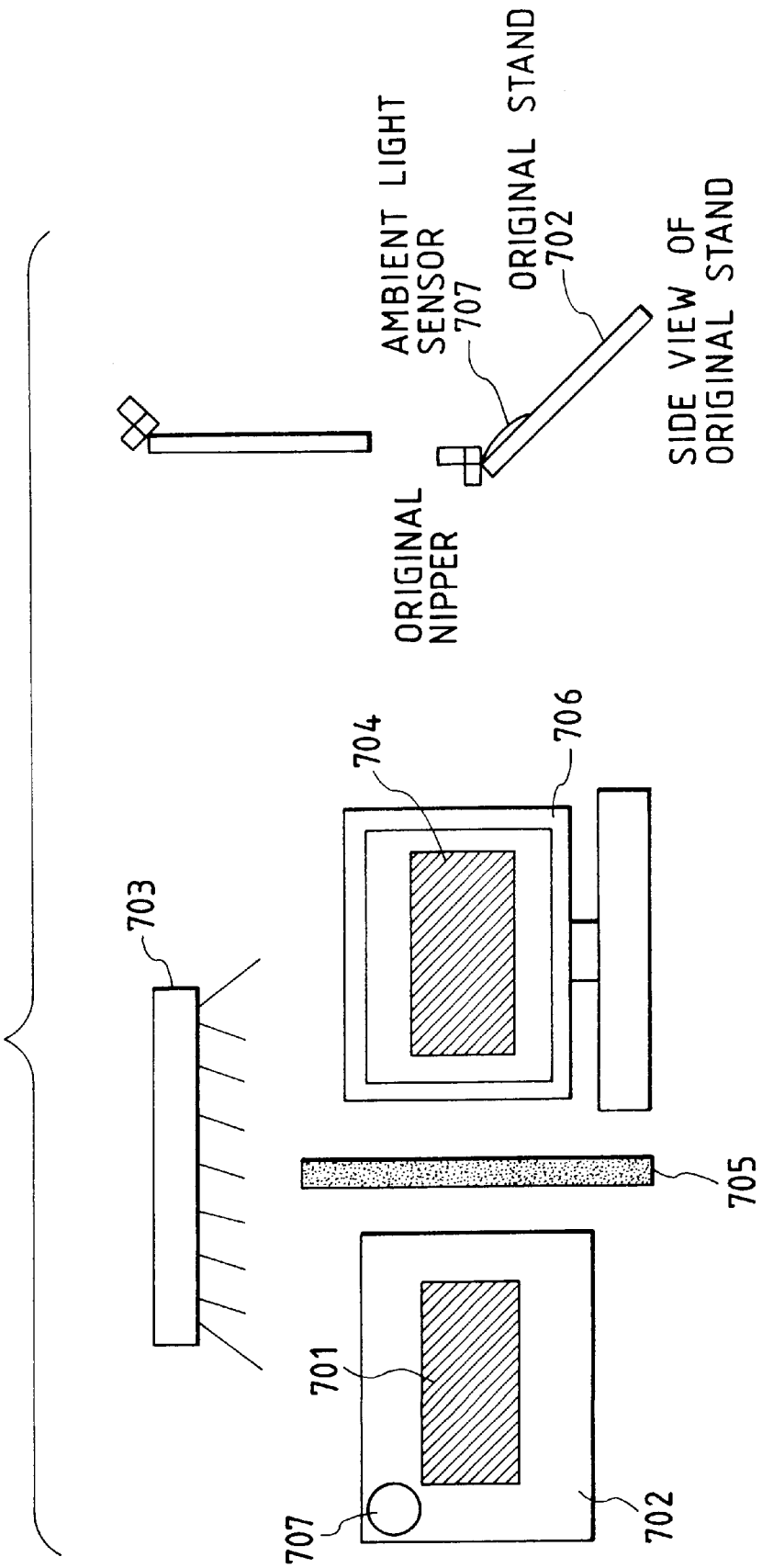
FIG. 12 is a view showing the fourth embodiment of the present invention.

FIG. 12 shows environment in which the image is observed and an arrangement of an ambient light sensor 707 when such an observation is performed.

In the present embodiment, since the ambient light sensor 707 is mounted on an original stand 702, the environment in which the image is actually observed is highly similar to a situation in which the ambient sensor is mounted. Therefore, information concerning the observation environment can more accurately be obtained.

Actually, the present embodiment is applicable to a copy machine which comprises a monitor having a previewer function. That is, in a case where an original is read by a scanner of the copy machine and the obtained original is faithfully previewed on the monitor, ambient light information suitable for an image observation state can be obtained according to the present embodiment. Therefore, it can be obtained the image in which seeming of image on the original is further coincided with seeming of image on the monitor.

(Fifth Embodiment)

Figure 13:
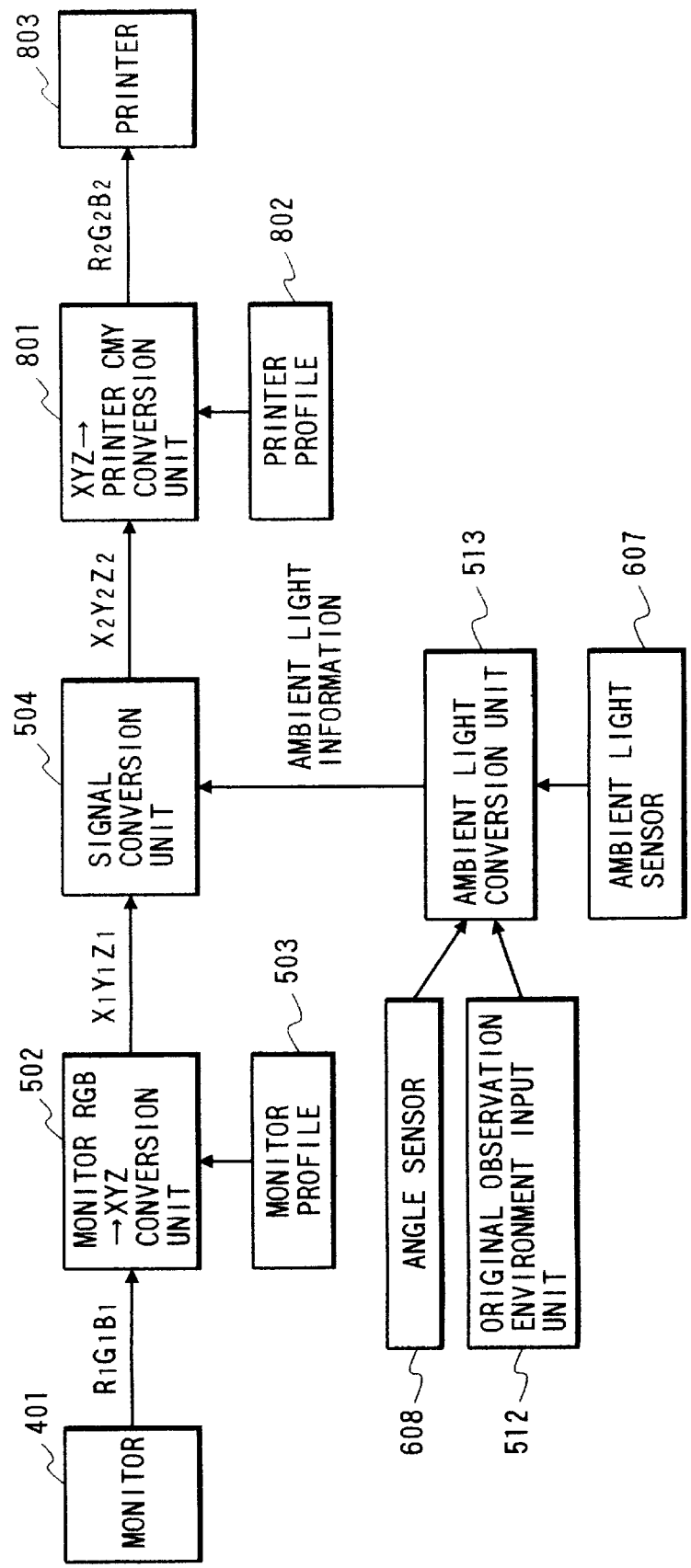
FIG. 13 is a view showing a data flow in the fifth embodiment of the present invention.

It will next be explained a system to which the invention in the third embodiment is applied in a case where an ambient light is measured and an image is output from a printer by using obtained ambient light information, with reference to FIG. 13.

In a case where the image which was displayed and corrected on a monitor is output by the printer, the ambient light information for observing the output image is detected by an ambient light sensor, and a light source conversion process is then performed based on such the information.

In a case where the image which was corrected on the monitor is subjected to a color process using the information from the ambient light sensor and then output from the printer, one of observation states of the output image is determined as a standard observation condition. Then, the information from the sensor is converted such that the sensed ambient light becomes an ambient light which should be sensed by an observer in the state determined as the standard observation condition. In this-case, if the determined observation state coincides with the actual observation state, any problem will not be occurred. However, if the actual observation state differs from the determined observation state, an aberration or difference occurs between the ambient light information actually sensed by the observer and the ambient light information converted based on the standard observation condition.

In the present embodiment, therefore, in the same manner as shown in FIG. 10, an angle at which the image output from the printer is observed is detected by an angle sensor 608 or input by an original observation environment input unit 512, whereby a luminance to be sensed by the observer is accurately predicted. Therefore, the ambient light information obtained from an ambient light sensor 707 is coincided with the ambient light information sensed by the observer.

The present invention has been explained by the preferred embodiments thereof, but the present invention is by no means limited to such the embodiments and is subjected to various further modifications with the scope and spirit of the appended claims.

What is claimed is:

1. An image processing method which performs a conversion process according to observation environment light of an output image, said method comprising a registration step of registering color-measured data of a light source and annexed information concerning the light source, wherein said method has:

a first mode that includes:

a step of simultaneously outputting in parallel an image obtained by the conversion process according to the observation environment light of the output image and the annexed information concerning plural light sources, respectively on the basis of the registered color-measured data of the plural light sources, and a second mode that includes:

a display step of displaying a list of the annexed information, a step of inputting a user's selection instruction from among the annexed information displayed on the list, and a step of outputting the image obtained by the conversion process according to the observation environment light of the output image, on the basis of the color-measured data of the light source according to the selection instruction.

2. A method according to claim 1, wherein the annexed information includes a light source information name.

3. A method according to claim 1, wherein the annexed information includes information concerning a place at which a light source is measured.

4. A method according to claim 1, wherein, if the light source information is not stored in said storage means, such an event is notified to the user.

5. A recording medium which stores a computer-readable program for an image processing method which performs a conversion process according to observation environment light of an output image, said method comprising a registration step of registering color-measured data of a light source and annexed information concerning the light source, wherein said method has:

a first mode that includes:
   a step of simultaneously outputting in parallel an image obtained by the conversion process according to the observation environment light of the output image and the annexed information concerning plural light sources, respectively on the basis of the registered color-measured data of the plural light sources, and a second mode includes:
   (a) a display step of displaying a list of the annexed information,
   (b) a step of inputting a user's selection instruction from among the annexed information displayed on the list, and
   (c) a step of outputting the image obtained by the conversion process according to the observation environment light of the output image, on the basis of the color-measured data of the light source according to the selection instruction.

6. An image processing method which simulates color appearance of output image in an observation environment light, comprising:

a step of providing measured data and annexed information to each of plural light sources;

a step of performing a conversion process according to the observation environment light of the output image, to color data;

a step of performing a color process according to an output characteristic of an output device, to the color data subjected to the conversion process; and a step of simultaneously outputting an image obtained in said color process step and said conversion process step, and the annexed information, respectively on the basis of a plurality of the provided light sources.

7. A method according to claim 6, wherein the annexed information includes a light source information name.

8. A recording medium which stores a computer-readable program to realize an image processing method which simulates color appearance of output image in an observation environment light, said method comprising:

a step of providing measured data and annexed information to each of plural light sources;

a step of performing a conversion process according to the observation environment light of the output image, to color data;

a step of performing a color process according to an output characteristic of an output device, to the color data subjected to the conversion process; and a step of simultaneously outputting an image obtained in said color process step and said conversion process step, and the annexed information, respectively on the basis of a plurality of the provided light sources.

\* \* \* \* \*

UNITED STATES PATENT AND TRADEMARK OFFICE
CERTIFICATE OF CORRECTION

PATENT NO. : 6,240,204 B1
DATED : May 29, 2001
INVENTOR(S) : Yumiko Hidaka et al.

It is certified that error appears in the above-identified patent and that said Letters Patent is hereby corrected as shown below:

Title page,
Item [54], Title: "IMAGE DATA CONVERSION ON THE BASIS OF OBSERVATION LIGHT OF AN OUTPUT IMAGE" should read
-- PERFORMING IMAGE DATA CONVERSION ACCORDING TO THE IMAGE DATA CONVERTED ON THE BASIS OF THE PLURAL LIGHT SOURCE INFORMATION --.

Column 1,
Line 9, "case" should read -- a case --;
Line 18, "becomes" should be deleted;
Line 22, "the" should read -- a --;
Line 23, "a" should read -- the --;
Line 58, "the seem coincident" should be deleted; and
Line 59, "coincident" should read -- seem coincident --.

Column 2,
Line 23, "such the" should read -- such --.

Column 3,
Line 61, "An another" should read -- Another --.

Column 4,
Line 2, "of-the" should read -- of the --; and
Line 4, "has," should read -- has: --.

Column 5,
Line 8, "an another" should read -- another --;
Line 15, "to" should read -- to the --;
Line 38, "referred" should read -- referred to --; and
Line 50, "he wishes" should read -- they wish --.

Column 6,
Line 23, "following" should read -- the following --;
Line 50, "a-light" should read -- a light --; and
Line 55, "a" should read -- an --.

Column 7,
Line 40, "of an" should read -- of a --; and
Line 50, "not-stored" should read -- not stored --.

UNITED STATES PATENT AND TRADEMARK OFFICE
CERTIFICATE OF CORRECTION

PATENT NO.    : 6,240,204 B1
DATED         : May 29, 2001
INVENTOR(S)   : Yumiko Hidaka et al.

It is certified that error appears in the above-identified patent and that said Letters Patent is hereby corrected as shown below:

Column 8,
Line 47, "he intends" should read -- they intend --.

Column 9,
Line 21, "the" should read -- a --.

Column 10,
Line 9, "450," should read -- 45°, --;
Line 57, "tion." should read -- tions. --; and
Line 63, "more" should be deleted.

Column 11,
Line 15, "the even" should read -- even --;
Line 54, "seeming" should read -- appearance --;
Line 55, "seeming" should read -- appearance --; and
Line 67, "the" should be deleted.

Column 12,
Line 3, "of" should read -- of the --;
Line 8, "this-case," should read -- this case, --;
Line 10, "any problem will not be occurred" should read -- no problem will occur --; and
Line 26, "the" should be deleted.

Signed and Sealed this

Twenty-fifth Day of June, 2002

*Attest:*

JAMES E. ROGAN
*Attesting Officer*     *Director of the United States Patent and Trademark Office*